Sept. 22, 1959 P. KOHLER ET AL 2,905,705
PROCESS FOR THE MANUFACTURE OF TRIALKYL PHOSPHITES
Filed July 5, 1957
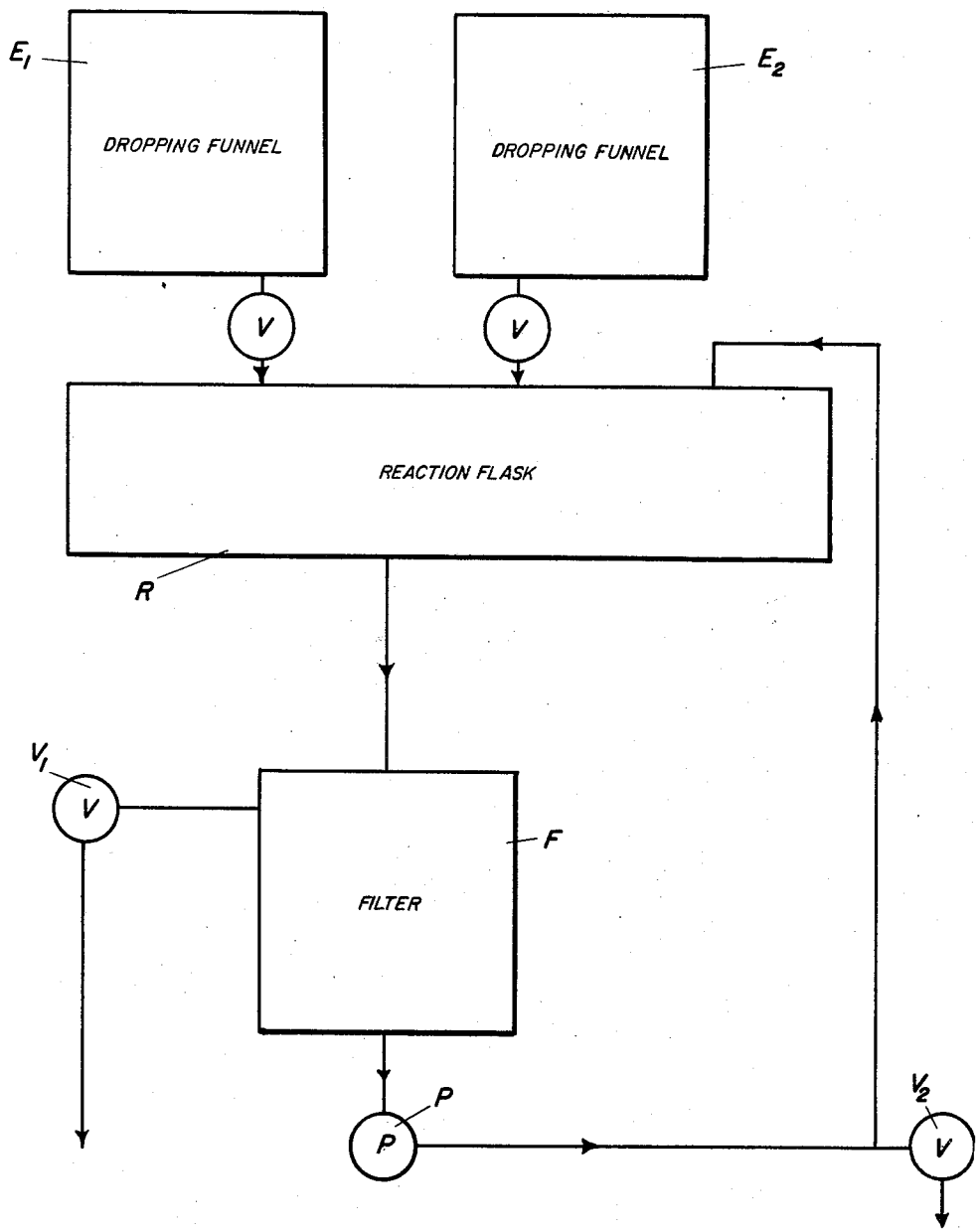
INVENTORS;
Paul Kohler,
Daniel Porret, and
Felix Tetaz
BY Wenderoth, Lind & Ponack
ATTORNEYS 2,905,705
Patented Sept. 22, 1959

2,905,705

PROCESS FOR THE MANUFACTURE OF TRIALKYL PHOSPHITES

Paul Kohler, Aigle, and Daniel Porret and Felix Tetaz, Monthey, Switzerland, assignors to Ciba Limited, Basel, Switzerland Application July 5, 1957, Serial No. 670,174

Claims priority, application Switzerland July 6, 1956

13 Claims. (Cl. 260—461)

This invention relates to the manufacture of trialkyl phosphites.

It is known, for the manufacture of trialkyl phosphites to react an alcohol upon phosphorus trichloride in the presence of a tertiary amine and an inert solvent.

The reaction in this case takes place according to the following equation

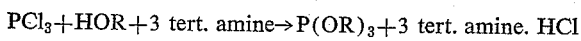

$PCl_3 + HOR + 3$ tert. amine $\rightarrow P(OR)_3 + 3$ tert. amine. HCl

The separation of the amine hydrochloride has hitherto taken place in general by dissolving the same out of the reaction mixture by means of water. This method has the disadvantage in the case of the manufacture of trimethyl phosphite that the yield of the end product is reduced because the phosphite concerned is not very stable to water.

For a relatively smooth course of the reaction, which is advantageously conducted at room temperature, a good stirring and also an effective cooling for the purpose of withdrawing the reaction heat evolved are necessary. For this reason, the presence of an inert solvent as diluent is required, since otherwise an effective mixing and cooling is rendered more difficult or impossible owing to the deposited solid amine hydrochloride leading to a thickening of the reaction mixture.

In the known process the difficulty existed that a large quantity of the solvent had to be added in order to guarantee a good cooling and stirring, and that for this reason it was only possible to obtain solutions with a content of at most 6–8% of phosphite. This rendered necessary an extremely large volume of the reaction and distillation apparatus.

Even when this precaution was taken, the yield of phosphite obtained by the known process was relatively low, which was probably in part due to the fact that a further reaction took place between the trialkyl phosphite formed and the amine hydrochloride, as a result of which amine was probably liberated.

The present invention is based on the observation that in the manufacture of trialkyl phosphites by reaction of phosphorus trichloride with low-molecular aliphatic alcohols in the presence of a tertiary amine and an inert solvent, the yield can be considerably increased and/or the final concentration of the trialkyl phosphite in the inert solvent considerably raised, when at least a part of the reaction mixture is led from the zone in which the phosphorus trichloride is mixed with the alcohol and the amine, continuously into a zone where the solid amine hydrochloride is separated from the reaction mixture.

According to a preferred embodiment of the process of the invention, the reaction mixture is recycled and the solid amine hydrochloride formed separated continuously from the reaction mixture, the precaution being taken that in this operation the quantity of the amine hydrochloride formed which is present in the reaction mixture always remains small.

In this case the quantity of the amine hydrochloride in the reaction mixture should preferably always be less than the quantity of amine hydrochloride equivalent to a concentration of 8% by weight of trialkyl phosphite calculated upon the quantity of the inert solvent.

According to a first embodiment of the process of the invention there are added to the reaction mixture, or to the solvent, all three starting materials, namely the alcohol, the amine and the phosphorus trichloride, only gradually, the reaction mixture being continuously passed from the reaction vessel through a filter, for example by means of a pump, for the purpose of removal of the separated amine hydrochloride, and thereupon returned to the reaction vessel. After washing with another quantity of the similar inert solvent to that used in the reaction, the solid radical of amine salt is removed either continuously or discontinuously and the free base regenerated therefrom. As soon as the concentration of trialkyl phosphite in the circulating reaction mixture has attained to the desired value, after filtration of the solution a suitable quantity thereof is continuously withdrawn at such a rate that the concentration of the reaction product in the recycled reaction mixture remains approximately constant. The wash liquid is likewise returned to the process.

According to a further embodiment of the new process, at the commencement of an operation cycle the total quantity of alcohol and amine are introduced into the reaction mixture and only the phosphorus trichloride is added gradually. In this case only the filtration takes place continuously and in this embodiment special care must be taken towards the end of the reaction that not even the smallest excess of phosphorus trichloride occurs in the reaction mixture. This object is easily achieved by a pH-control of the reaction medium by means of an indicator or a glass electrode. It is also possible to operate without recycling by introducing the three starting materials continuously at one end of a reaction vessel and continuously drawing off the reaction mixture at the other end of the reaction vessel and removing therefrom the solid amine hydrochloride formed.

This embodiment of the process is less advantageous than working with recycling, for the reason that in this case the final concentration of phosphite cannot as a rule substantially exceed 9% and moreover the transfer and cooling of the very viscous reaction mixture encounters difficulties.

The process of the invention is more especially suitable for the manufacture of trimethyl phosphite by reaction of phosphorus trichloride and methanol. It is also possible, however, in a similar manner to produce other low trialkyl phosphites, such as triethyl phosphite, tripropyl phosphite and tributyl phosphite, by using instead of methanol other low-molecular aliphatic alcohols, such as ethanol, n-propanol, isopropanol, n-butanol or isobutanol.

As tertiary amines are concerned those of the aliphatic, alicyclic, aliphatic-aromatic and heterocyclic series having sufficiently strongly basic properties and of which the hydrochlorides are sufficiently difficultly soluble or are insoluble in the inert solvent used. It is further desirable, for the purpose of more easy recovery of the amine from the filter radical, that the free base shall only be slightly soluble in water.

Accordingly it is of advantage to use trialkylamines of which the alkyl radicals contain 2–4 carbon atoms, such as tributylamine, tripropylamine and more especially triethylamine.

As inert solvents are concerned especially hydrocarbons of the aliphatic series, of the cycloaliphatic series, the araliphatic series and the aromatic series.

The inert solvent is advantageously so selected that the trialkyl phosphite formed can easily be separated therefrom by fractional distillation. For this reason, for example in the manufacture of trimethyl phosphite, the boiling point of which is 120° C., solvents are used which either have a substantially lower boiling point, such as petroleum ether or benzene, or a substantialy higher boiling point such as trichlorobenzene or decaline.

The following examples illustrate the invention, the percentages being by weight:

Example 1

In an apparatus the parts of which are shown in the accompanying drawing which illustrates a flow diagram, trimethylphosphite is produced in the following manner:

In a reaction vessel R, for example a three-necked flask of 2.5 liters content, a mixture is prepared of 600 grams of benzene,
1050 grams of triethylamine and
350 grams of methanol.

A single $E_2$, for example a dropping funnel, is charged with a solution of 481 grams of phosphorus trichloride in 300 grams of benzene. This solution is gradually allowed to flow into the flask with good stirring and cooling, the temperature being maintained constant at 25°±5° C. During the whole time of the introduction of the phosphorus trichloride solution, the reaction mixture is continuously recycled by means of a pump P in a closed circuit through a filter F. The duration of reaction amounts to about 3 hours. At the conclusion a slight excess of amine remains.

When the introduction of phosphorus trichloride is complete. the whole is filtered and the triethylamine hydrochloride residue extracted by washing with benzene. The wash liquid is added to the filtrate and the combined solutions distilled. In this manner about 311 grams of trimethyl phosphite are obtained, corresponding to a yield of 72% of the theoretical.

In this example, the final concentration of the trimethyl phosphite amounts to 311 grams in 1300 grams of solution, or 24%, whereas without continuous filtration a concentration of the trimethyl phosphite of 8% cannot be exceeded.

Example 2

In this and the following examples there is added at the commencement of the reaction a certain quantity of tri- and dialkyl phosphite, in order to indicate the course of the reaction in the case of continuous operation:

In an apparatus as shown in the accompanying drawing, trimethyl phosphite is prepared as follows:

In the reaction flask R is provided a solution containing 90 grams of trimethyl phosphite and 22 grams of dimethyl phosphite in 1300 grams of benzene to which about 5 mg. of an indicator, such as Methyl Red, have been added.

A second dropping funnel $E_1$ is charged with a solution of 909 grams (=9 mols) of triethylamine and 304 grams (=9.5 mols) of methanol in 1350 grams of benzene, while the dropping funnel $E_2$ is charged with a benzene solution of 412.5 grams (3 mols) of phosphorus trichloride.

While both cooling and stirring continuously, the two solutions from $E_1$ and $E_2$ are simultaneously allowed to flow into the flask R, the introduction being regulated in such a manner that a slight excess of amine is always present and the temperature being maintained approximately constant at 25° C. By noting a yellow coloration of the indicator, the pH of the reaction medium can be easily observed and an excess of phosphorus trichloride avoided.

During the gradual introduction of the solutions, the reaction mixture is recycled by the pump P through the filter F. The amine salt separated in the filter F is washed with benzene introduced through the cock $V_1$. The wash liquid is then combined with the filtered solution. At the same time a portion of the filtrate is drawn off through the cock $V_2$ in such a manner that the liquid level in the reaction flask R remains approximately constant.

When the introduction of the solutions from $E_1$ and $E_2$ is complete, the whole of the reaction mixture is filtered, the amine salt washed in the above described manner and the combined clear solutions are subjected to distillation. Deducting the quantity of trimethyl phosphite originally present in the apparatus, there is obtained in this manner a total of about 298 grams of trimethyl phosphite, corresponding to a yield of 80% of the theoretical.

Example 3

The operation is the same in principle as in Example 2, the following variations being effected:

In the reaction flask a benzene solution is provided containing 16% of trimethyl phosphite and 4% of dimethyl phosphite.

In a continuously operated cycle the dropping funnel $E_1$ is charged with a benzene solution of phosphorus trichloride. The preparation of these solutions takes place progressively, the benzene used for this purpose (a total of 1800 grams) having previously been passed through the filter for the continuous washing of the triethylamine hydrochloride. This wash benzene is then divided between the funnel containing the amine and alcohol on the one hand and the funnel containing the phosphorus trichloride on the other.

The solutions are allowed to flow in with stirring and cooling to 20–25° C. the introduction being regulated in such a manner that a slight excess of amine always prevails in the reaction vessel. The continuous filtration and washing of the crystals of the amine salt and the continuous withdrawal of the filtered solution take place in an analogous manner to that described in Example 2. When the introduction of the solutions from $E_1$ and $E_2$ is complete, the withdrawn, filtered reaction mixture is distilled. 266 grams (approx.) of trimethyl phosphite are obtained, corresponding to a yield of 72% of the theoretical.

Example 4

In an apparatus according to the accompanying drawing, triethyl phosphite is prepared in a manner analogous to that described in Examples 2 and 3 as follows:

A solution of 200 grams of triethyl phosphite in 1200 grams of benzene is provided in the reaction vessel R and a little Methyl Red is added. The dropping funnel $E_1$ is charged with 606 grams of triethylamine, 280 grams of absolute ethanol and 1200 grams of anhydrous benzene and the dropping funnel $E_2$ with 270 grams of phosphorous trichloride and 600 grams of benzene.

The addition of the various reagents is regulated in such a manner that during the whole period of reaction a definite excess of amine is maintained. The temperature is kept at about 25° C. The reaction mixture is continuously filtered in a closed cycle. The filtered solution is withdrawn in proportion to the quantities of the reagents added so that the volume of liquid circulating remains approximately constant.

The washing of the filtered triethylamine hydrochloride and the distilling of the solutions takes place in the manner described in the preceding examples.

In this manner there are obtained about 270 grams of triethylphosphite, corresponding to a yield of 83% of the theoretical.

Alternatively it is also possible to proceed as described in Example 1 in connection with the production of trimethyl phosphite, the total quantity of triethylamine being provided in the reaction flask.

Example 5

In the lower part of a vertical tubular reaction vessel of a length of 1.5 meters with a coaxial stirrer (350 revs. per min.), the reaction vessel being provided with an external cooling jacket and the stirrer with a hollow shaft for the circulation of cooling water, there are introduced simultaneously 60 kg. per hour of a benzene solution containing 22% of phosphorus trichloride and 60 kg. per hour of a benzene solution containing 48% of triethylamine and 16% of methanol.

The reaction mixture is withdrawn from the upper part of the reaction vessel in the form of a thick paste and the triethylamine hydrochloride is immediately filtered from reaction product and washed twice with benzene. 132 kg. per hour are obtained of a benzene solution with a content of 9% of trimethyl phosphite. The quantity of benzene used for the first washing is included in this figure, whereas the benzene from the second washing is used again for the next washing.

The quantity of trimethyl phosphite obtained corresponds to a yield of 82% calculated upon phosphorus trichloride introduced.

What is claimed is:

1. A process for the manufacture of trialkyl phosphites by reaction of phosphorus trichloride with low-molecular aliphatic alcohols in the presence of a tertiary amine and an inert solvent, wherein the reaction mixture is recycled and the solid amine hydrochloride formed separated continuously from the reaction mixture, the precaution being taken that in this operation the quantity of the amine hydrochloride formed which is present in the reaction mixture always remains small.

2. A process for the manufacture of trialkyl phosphites by reaction of phosphorus trichloride with low-molecular aliphatic alcohols in the presence of a tertiary amine and an inert solvent, wherein the reaction mixture is recycled and the solid amine hydrochloride formed separated continuously from the reaction mixture, the precaution being taken that in this operation the quantity of the amine hydrochloride present in the reaction mixture is always less than the quantity of amine hydrochloride equivalent to a concentration of 8% by weight of trialkyl phosphite calculated upon the quantity of the inert solvent.

3. A process for the manufacture of trialkyl phosphites by reaction of phosphorus trichloride with low-molecular aliphatic alcohols in the presence of a tertiary amine and an inert solvent, wherein there are added to the reaction mixture all three starting materials, namely the alcohol, the amine and the phosphorus trichloride, only to a gradual extent, the reaction mixture being simultaneously recycled with separation of the amine hydrochloride progressively formed, the precaution being taken that in this operation the quantity of the amine hydrochloride formed which is present in the reaction mixture always remains small.

4. A process for the manufacture of trialkyl phosphites by reaction of phosphorus trichloride with low-molecular aliphatic alcohols in the presence of a tertiary amine and an inert solvent, wherein the total quantity of alcohol and amine are present in the reaction mixture, the phosphorus trichloride is gradually added and the reaction mixture is simultaneously recycled with separation of the amine hydrochloride continuously formed, the precaution being taken that in this operation the quantity of the amine hydrochloride formed which is present in the reaction mixture always remains small.

5. A process for the manufacture of trialkyl phosphites by reaction of phosphorus trichloride with low-molecular aliphatic alcohols in the presence of a tertiary amine and an inert solvent, wherein at least a part of the reaction mixture is led from the zone in which the phosphorus trichloride is mixed with the alcohol and the amine, continuously into a zone where the solid amine hydrochloride is separated from the reaction mixture and for washing the separated amine hydrochloride the same inert solvent is used as for the reaction, the precaution being taken that in this operation the quantity of the amine hydrochloride formed which is present in the reaction mixture always remains small.

6. A process according to claim 5, wherein the inert solvent used for washing the separated amine hydrochloride is afterwards introduced into the reaction mixture.

7. A process for the manufacture of trialkyl phosphites by reaction of phosphorus trichloride with low-molecular aliphatic alcohols in the presence of a tertiary amine and an inert solvent, wherein at least a part of the reaction mixture is led from the zone in which the phosphorus trichloride is mixed with the alcohol and the amine, continuously into a zone where the solid amine hydrochloride is separated from the reaction mixture and at a desired final concentration of trialkyl phosphite in the reaction mixture, after separation of the amine hydrochloride a portion of the reaction mixture is continuously withdrawn, the precaution being taken that in this operation the quantity of the amine hydrochloride formed which is present in the reaction mixture always remains small.

8. A process for the manufacture of trialkyl phosphites by reaction of phosphorus trichloride with low-molecular aliphatic alcohols in the presence of a tertiary amine and an inert solvent, wherein at least a part of the reaction mixture is led from the zone in which the phosphorus trichloride is mixed with the alcohol and the amine, continuously into a zone where the solid amine hydrochloride is separated from the reaction mixture by filtration, the precaution being taken that in this operation the quantity of the amine hydrochloride formed which is present in the reaction mixture always remains small.

9. A process as claimed in claim 1, wherein as low-molecular aliphatic alcohol methanol is used.

10. A process as claimed in claim 1, wherein as low-molecular aliphatic alcohol ethanol is used.

11. A process as claimed in claim 1, wherein as tertiary amine triethylamine is used.

12. A process as claimed in claim 1, wherein phosphorus trichloride is reacted with methanol in the presence of triethylamine and at least one hydrocarbon of which the boiling point is substantially higher or substantially lower than 120° C. as the inert solvent.

13. A process as claimed in claim 12, wherein as inert solvent benzene is used.

References Cited in the file of this patent

UNITED STATES PATENTS 2,175,509  Rogers et al. _____ Oct. 10, 1939
2,587,616  Harman _____ Mar. 4, 1952

FOREIGN PATENTS 1,104,616  France _____ June 15, 1955